US011953263B2

(12) United States Patent
Templeman

(10) Patent No.: US 11,953,263 B2
(45) Date of Patent: Apr. 9, 2024

(54) EXTRUDED ALUMINUM STICKER FOR SPACING WOOD

(71) Applicant: Imagineering Werks, LLC, West Palm Beach, FL (US)

(72) Inventor: Steven W. Templeman, West Palm Beach, FL (US)

(73) Assignee: Imagineering Werks, LLC, West Palm Beach, FL (US)

(*) Notice: Subject to any disclaimer, the term of this patent is extended or adjusted under 35 U.S.C. 154(b) by 599 days.

(21) Appl. No.: 17/203,462

(22) Filed: Mar. 16, 2021

(65) Prior Publication Data

US 2022/0299266 A1 Sep. 22, 2022

(51) Int. Cl.
*F26B 3/04* (2006.01)
*F26B 25/18* (2006.01)

(52) U.S. Cl.
CPC ........ *F26B 25/185* (2013.01); *F26B 2210/16* (2013.01)

(58) Field of Classification Search
CPC ....... F26B 25/185; F26B 2210/16; F26B 3/04
USPC ........................................................... 34/94
See application file for complete search history.

(56) References Cited

U.S. PATENT DOCUMENTS

D22,187 S 1/1893 Harsha
3,365,517 A 1/1968 Barth
D216,014 S 11/1969 Dupont
3,686,817 A 8/1972 Adams
3,900,957 A 8/1975 Denton et al.
4,059,914 A 11/1977 Dobson
4,199,870 A 4/1980 Arsenault
4,663,860 A 5/1987 Beall
4,788,777 A 12/1988 Davis
4,811,516 A 3/1989 Anderson
5,131,559 A 7/1992 Ariyoshi et al.
D343,350 S 1/1994 Gold
(Continued)

FOREIGN PATENT DOCUMENTS

WO 2009105253 A2 8/2009

OTHER PUBLICATIONS

The Softwood Forest Products Buyer, "Military Grade Aluminum Alloy Stacking Sticks Now Available", vol. 35. No. 5, Sep./Oct. 2020.

(Continued)

*Primary Examiner* — John P Mccormack
(74) *Attorney, Agent, or Firm* — Martin & Associates, LLC; Derek P. Martin

(57) ABSTRACT

A sticker for spacing wood is extruded from an aluminum alloy. The sticker can have different configurations. In a first configuration, the sticker has a width about the same as its height, with longitudinal ridges on all sides that grip wood when wood is stacked on the sticker. In a second configuration, the sticker has a width significantly greater than its height, with longitudinal ridges on the top and bottom surfaces, and with smooth side surfaces. The longitudinal ridges have a height within a specified range and are spaced at a distance peak-to-peak within a specified range. The ridges provide good grip of lumber stacked on the sticker yet do not easily plug with wood fibers through repeated use. The extruded aluminum sticker is very rugged and can be used for hundreds or even thousands of drying cycles.

16 Claims, 9 Drawing Sheets

(56) References Cited

U.S. PATENT DOCUMENTS

| | | | | |
|---|---|---|---|---|
| 5,345,695 | A * | 9/1994 | Graham | F26B 25/185 34/239 |
| 5,461,836 | A | 10/1995 | Yang | |
| D372,539 | S | 8/1996 | Davies | |
| D378,347 | S | 3/1997 | Bain | |
| 5,813,137 | A | 9/1998 | Townsend | |
| 6,134,803 | A | 10/2000 | Gilchrist | |
| D451,612 | S | 12/2001 | Thibault et al. | |
| 6,345,652 | B1 | 2/2002 | Townsend | |
| 6,517,926 | B1 * | 2/2003 | Therrien | B65G 1/14 428/113 |
| RE38,118 | E | 5/2003 | Townsend | |
| 7,003,898 | B2 | 2/2006 | Aaron | |
| D538,219 | S | 3/2007 | Rakow | |
| D569,655 | S | 5/2008 | Williams | |
| 7,926,199 | B2 | 4/2011 | Aaron | |
| D664,025 | S | 7/2012 | Horn | |
| D664,921 | S | 8/2012 | Stone et al. | |
| D689,206 | S | 9/2013 | Ellsworth | |
| 8,556,976 | B2 | 10/2013 | Jacofsky | |
| 9,121,177 | B1 | 9/2015 | Sorkin | |
| D744,666 | S | 12/2015 | Weber | |
| 9,309,714 | B2 | 4/2016 | Nieminen | |
| D796,344 | S | 9/2017 | Paulick | |
| 9,845,990 | B2 | 12/2017 | Wagner | |
| 9,851,148 | B2 | 12/2017 | Templeman et al. | |
| D807,153 | S | 1/2018 | Templeman et al. | |
| D826,694 | S | 8/2018 | Templeman et al. | |
| 10,234,203 | B2 | 3/2019 | Townsend | |
| 10,365,041 | B2 | 7/2019 | Templeman et al. | |
| D902,695 | S | 11/2020 | Pettey | |
| D939,331 | S | 12/2021 | Comalander | |
| 2007/0101608 | A1 | 5/2007 | Sundholm | |
| 2012/0047844 | A1 | 3/2012 | Walker | |
| 2013/0145971 | A1 | 6/2013 | Federl et al. | |
| 2014/0250825 | A1 * | 9/2014 | Richardson | F16B 7/187 411/81 |
| 2016/0290717 | A1 * | 10/2016 | Wagner | F26B 25/185 |
| 2016/0370114 | A1 * | 12/2016 | Templeman | F26B 25/185 |
| 2018/0099319 | A1 | 4/2018 | Pettey | |

OTHER PUBLICATIONS

The Softwood Forest Products Buyer Facebook Page, printed from https:/www.facebook.com/softwoodforestbuyer/photos/a.130804755334274/1658148151666 01/?type=3&eid=ARBzubWuV9Wp7xkEPcgSQK5uYdqbPB34FoNMJwsCL2dbKhNWNWNidJnhbmQJObacjlbVibKzM2-KavHY&_xts_[0]=68.ARC2XaohboZ9hvLpHk5EoxwLBfPvVD2HoGV-qFGjgvxlhsFPrXMLdKk8m8bPSupZapSprxlpW76p1oBWmf4_, Sep. 2020.

Brown, Lawrence D., "Dry Kiln Sticker Repair Costs and Procedures", 15th Meeting of the Western Dry Kiln Clubs, 1963.

Denig et al, "Drying Hardwood Lumber", USDA Forest Service Forest Products Laboratory General Technical Report FPL-GTR-118, 2000.

Rash, James K., "Engineered Kiln Stickers—A New Way to Save Costs", Chemicals Division Simpson Timber Company, Portland, Oregon, 1973.

Peabody et al., "Plastic Stickers for the Kiln Drying Operation", Portland Industrial Plastics Company, 1971.

Teesdale, L.V., "The Kiln Drying of Southern Yellow Pine Lumber", US Dept. of Agriculture, Jan. 1930.

Hendess et al., "Pipe and Tubing Extrusion", The SPE Guide on Extrusion Technology and Troubleshooting, Society of Plastics Engineers, 2001.

Bond et al., "A Decade of Improved Lumber Drying Technology", Curr. Forestry Rep. 2:106-118, 2016.

Guner, Ozgur, "Evaluation of Wood and Aluminum Stickers and their Stains on Heat Treated Spruce Boards", Master's Thesis, Lulea University of Technology, Feb. 2009.

The Forestry Forum, "Recommentations for synthetic stickers", printed from https://forestryforum.com/board/index.php?topic=88309.0 on Mar. 15, 2021, Jan. 26, 2016.

Wood-Mizer, "Introduction to Kiln Drying", printed from https://irp-cdn.multiscreensite.com/b7d5533c/files/uploaded/KLN%20INT%20ENG%20MAY%202016_Io.pdf on Mar. 15, 2021, 2016.

Zhang et al., "An Experimental Study of the Characteristics of Fluid Flow and Heat Transfer in the Multiport Mocrochannel Flat Tube", Abstract, Applied Thermal Engineering, vol. 65, Issues 1-2, p. 209-216, retrieved from https://reginnovations.org/key-scientific-articles/experimentalstudy-characteristics-fluid-flow-heat-transfer-multiport-microchannel-flat-tube/, Apr. 2014.

* cited by examiner

EXTRUDED ALUMINUM STICKER FOR SPACING WOOD

BACKGROUND

1. Technical Field

This disclosure generally relates to stickers used to stack lumber for drying, and more specifically relates to an extruded aluminum sticker.

2. Background Art

Lumber is typically sawn from a tree when the tree is green. Green lumber must be dried before it can be used. It is well-known to stack green lumber into layers separated by sticks known in the art as "stickers," which provide spaces between the layers of lumber that allow the lumber to dry properly. Many different kinds of stickers have been developed and used over the years. The most common stickers are wooden sticks that have a square or slightly rectangular cross-section. The problem with these stickers is they have a limited life and must be replaced after a relatively small number of drying cycles. The typical life of a wood sticker is 8-15 drying cycles.

One type of wooden sticker known in the art is made of Ipê wood (also called Brazilian walnut), which is taken from trees in the rain forests of Central and South America and Indonesia. Stickers made of Ipê wood are used because they are very dense and therefore have a longer life than stickers made of other types of wood, lasting as long as 30-40 cycles. However, the use of Ipê wood for stickers is contributing to deforestation of the Central, South American and Indonesian forests. It would be preferable to use other materials for stickers to prevent over-harvesting of certain slow-growth trees, especially those in the rain forests, for wooden stickers.

Many different types of stickers that are made of plastic have been developed. For example, the following United States Patents all show various stickers that are made of plastic: U.S. Pat. Nos. 4,788,777; 5,345,695; and 9,851,148. The stickers in these patents have different configurations, but each has some features that are not desirable, such as being heavier than they need to be, not providing a surface that grips the wood, and having a configuration that is easily plugged up with wood fibers. In addition, plastic stickers may not be able to withstand the level of heat in high-temperature kilns that range from 225-300 degrees Fahrenheit (107-149 degrees Celsius). Thus, there is a need for a sticker that does not have these undesirable features.

BRIEF SUMMARY

A sticker for spacing wood is extruded from an aluminum alloy. The sticker can have different configurations. In a first configuration, the sticker has a width about the same as its height, with longitudinal ridges on all sides that grip wood when wood is stacked on the sticker. In a second configuration, the sticker has a width significantly greater than its height, with longitudinal ridges on the top and bottom surfaces, and with smooth side surfaces. The longitudinal ridges have a height within a specified range and are spaced at a distance peak-to-peak within a specified range. The ridges provide good grip of lumber stacked on the sticker yet do not easily plug with wood fibers through repeated use. The extruded aluminum sticker is very rugged and can be used for hundreds or even thousands of drying cycles.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

A sticker for spacing wood is extruded from an aluminum alloy. The sticker can have different configurations. In a first configuration, the sticker has a width about the same as its height, with longitudinal ridges on all sides that grip wood when wood is stacked on the sticker. In a second configuration, the sticker has a width significantly greater than its height, with longitudinal ridges on the top and bottom surfaces, and with smooth side surfaces. The longitudinal ridges have a height within a specified range and are spaced at a distance peak-to-peak within a specified range. The ridges provide good grip of lumber stacked on the sticker yet do not easily plug with wood fibers through repeated use. The extruded aluminum sticker is very rugged and can be used for hundreds or even thousands of drying cycles.

Figure 1:
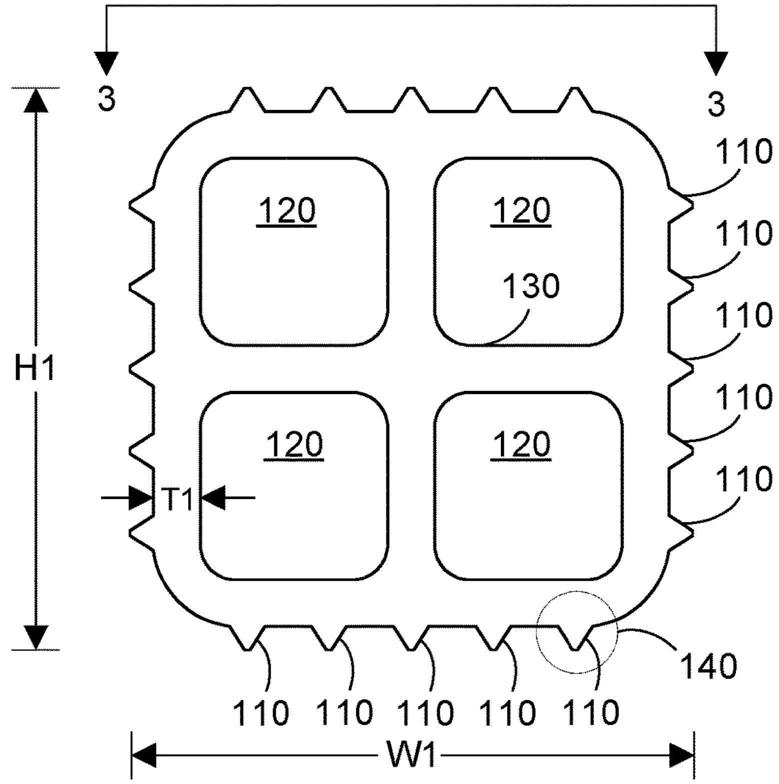
FIG. 1 is an end or cross-sectional view of a first configuration for an extruded aluminum sticker.
Figure 2:
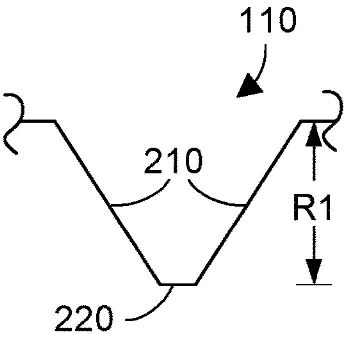
FIG. 2 is an enlarged view of one of the ridges shown at 140 in FIG. 1.
Figure 3:
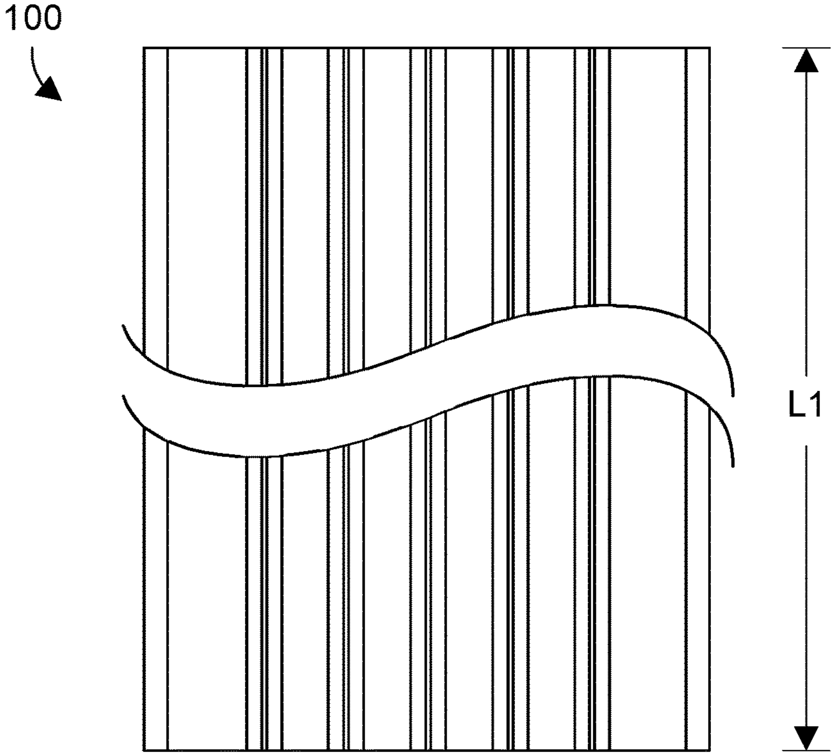
FIG. 3 is a top view of the sticker in FIG. 1 taken along the line 3-3.
Figure 4:
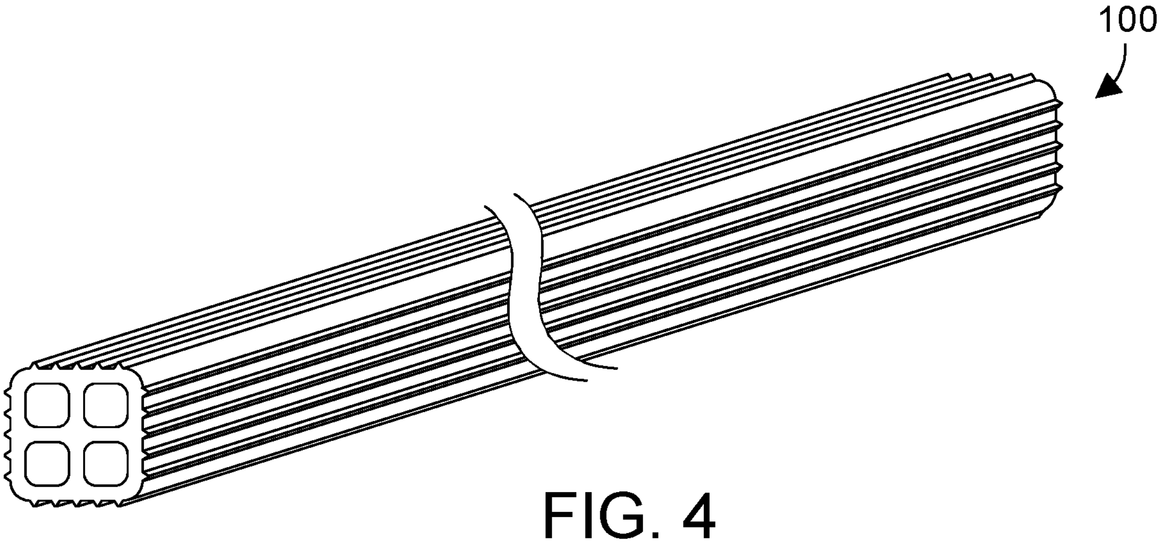
FIG. 4 is a perspective view of the sticker shown in FIGS. 1-3.

Referring to FIGS. 1-4, a first suitable configuration of an extruded aluminum sticker 100 in accordance with the disclosure and claims herein is shown. Sticker 100 has an end view as shown in FIG. 1, a top view as shown in FIG. 3, and a perspective view as shown in FIG. 4. The end view shown in FIG. 1 is the same as the cross-sectional view because the sticker is extruded through a die to achieve the final profile shown in FIG. 1. The sticker has a height H1, a width W1, and a length L1. The length L1 as shown in FIGS. 3 and 4 can be any suitable length, as represented by the break in the length in FIGS. 3 and 4. In one suitable implementation, the height H1 is 0.80 in. (20 mm), the width W1 is 0.80 in. (20 mm), and the length L1 can be any suitable length, such as 4 ft (1.2 m), 6 ft (1.8 m), 8 ft (2.4 m), and 12 ft (3.7 m). Of course, the sticker 100 can be made to any suitable dimensions and lengths depending on the specific application.

As shown in FIG. 1, sticker 100 includes a plurality of longitudinal ridges 110 along its top surface, bottom surface, and both side surfaces. Because the height H1 and width W1 are preferably the same, and all four exterior surfaces include the ridges 110, the sticker 100 can be used with any of its opposing exterior surfaces, such as top/bottom or side/side, contacting wood in a lumber stack. The use of extruded aluminum sticker 100 is simplified because any of its four sides can be placed down when using the sticker. One specific ridge 110 shown at 140 in FIG. 1 is shown enlarged in FIG. 2. Ridge 110 includes two angled side portions 210 and a flat tip portion 220. The angled side portions 210 can be at any suitable angle. In the most preferred implementation, the angled side portions 210 are at an angle of 80 degrees with respect to each other. The flat tip portion 220 provides a tip that is not sharp and this is not prone to break off, and also is much more easily produced via extrusion than ridges that have a sharp tip. While FIG. 2 shows no curvature at the intersection of lines, the preferred embodiments extend to rounding of any of the features in the extruded aluminum sticker to enhance manufacturability via an aluminum extrusion process. Ridges 110 have a height R1 shown in FIGS. 2 and 17. Ridge height R1 can be from 0.01 in. (0.25 mm) to 0.05 in. (1.3 mm), is more preferably 0.02 in. (0.51 mm) to 0.032 in. (0.81 mm), and is most preferably about 0.03 in. (0.76 mm). In some implementations, the ridge height may vary, such as having every other ridge one height with the ridges in between a different height. The disclosure and claims herein extend to any suitable ridge height or combinations of ridge heights.

The sticker 100 includes at least one substantially hollow longitudinal internal chamber. In the specific configuration shown in FIGS. 1, 4 and 5, the sticker 100 includes four substantially hollow longitudinal internal chambers 120. These substantially hollow longitudinal internal chambers 120 provide an internal structure 130 in the sticker 100 that reinforces the outside walls of the sticker 100. This internal structure 130 gives the sticker 100 additional strength for the compressive loads of a stack of lumber.

The top, bottom and sides of sticker 100 preferably have a thickness T1 shown in FIG. 1. In the most preferred implementation, the thickness T1 is 0.06 in. (1.5 mm). In the specific implementation shown in FIG. 1, the thickness T1 is the same for all walls in the sticker 100. However the thickness of different parts of the sticker 100 could vary within the scope of the disclosure and claims herein. In addition, the thickness of any side could be significantly more or less than 0.06 in. (1.5 mm) within the scope of the disclosure and claims herein.

Sticker 100 is suitable for use in stacking lumber when the stickers are placed manually by a worker, and can also be used by some existing automated stackers. In the most preferred implementation, the configuration of the top surface, bottom surface, and both side surfaces is identical, so it doesn't matter whether the sticker is right side up or upside down or sideways. Regardless of how the sticker 100 is placed on a stack of lumber, the sticker 100 will have the orientation shown in FIGS. 1 and 5.

Figure 5:
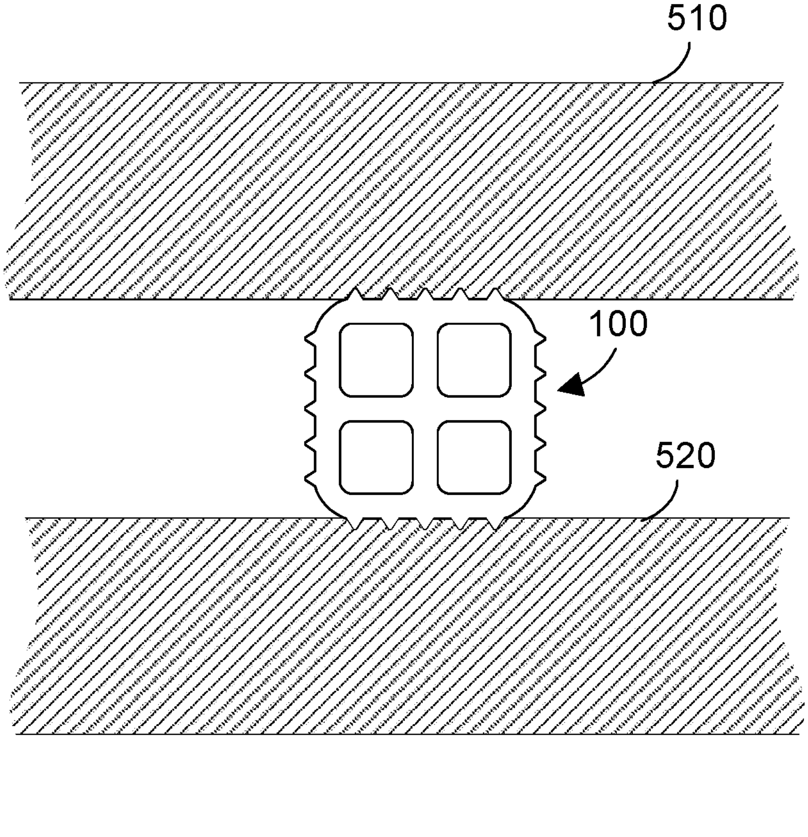
FIG. 5 is a cross-sectional view showing use of the sticker in FIGS. 1-4 for spacing two pieces of wood.

FIG. 5 shows the sticker 100 in FIGS. 1-4 between two boards 510 and 520. The ridges 110 of sticker 100 (see FIG. 1) penetrate the surface of the boards 510 and 520 as shown in FIG. 5. This allows the sticker 100 to bite into the wood and prevent the boards 510 and 520 from sliding on the sticker 100. Most known stickers have smooth surfaces that allow the wood to slide when placed on the sticker. A stack of lumber using smooth stickers can thus slide and even fall off the forks of a forklift that is transporting the stack of lumber. The extruded aluminum sticker 100 includes ridges 110 that bite into the wood and prevent the boards from sliding on the sticker, thereby providing an advantage over most known stickers. The penetration of the ridges into the boards leaves marks in the form of grooves in the surface of the boards. However, lumber that is being dried is not at it final dimension. In the United States, lumber removed from a kiln after drying is typically planed on both sides by 1/32 in. (0.8 mm) to achieve the final dimensions for the lumber. When the height of the ridges is in the more preferred range of 0.02 in. (0.51 mm) to 0.032 in. (0.81 mm), the final planing process will remove the grooves left by the extruded aluminum stickers in the lumber.

Figure 6:
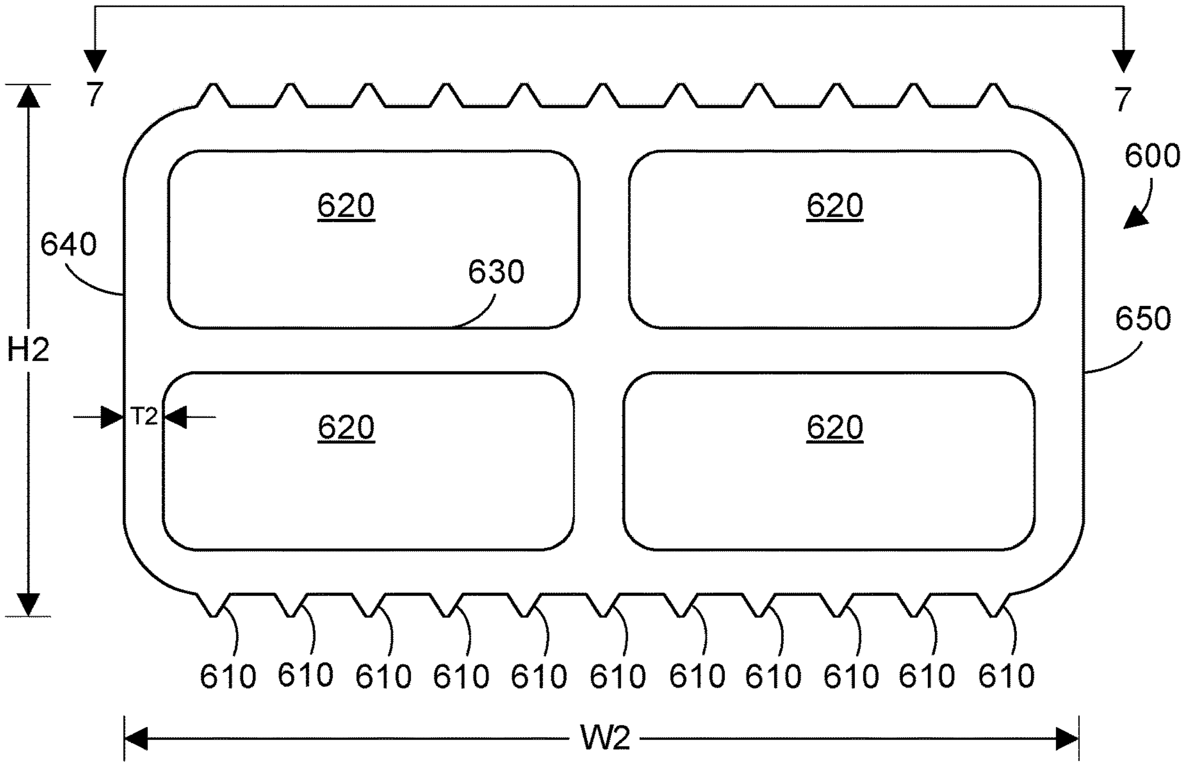
FIG. 6 is an end or cross-sectional view of a second configuration for the extruded aluminum sticker.
Figure 7:
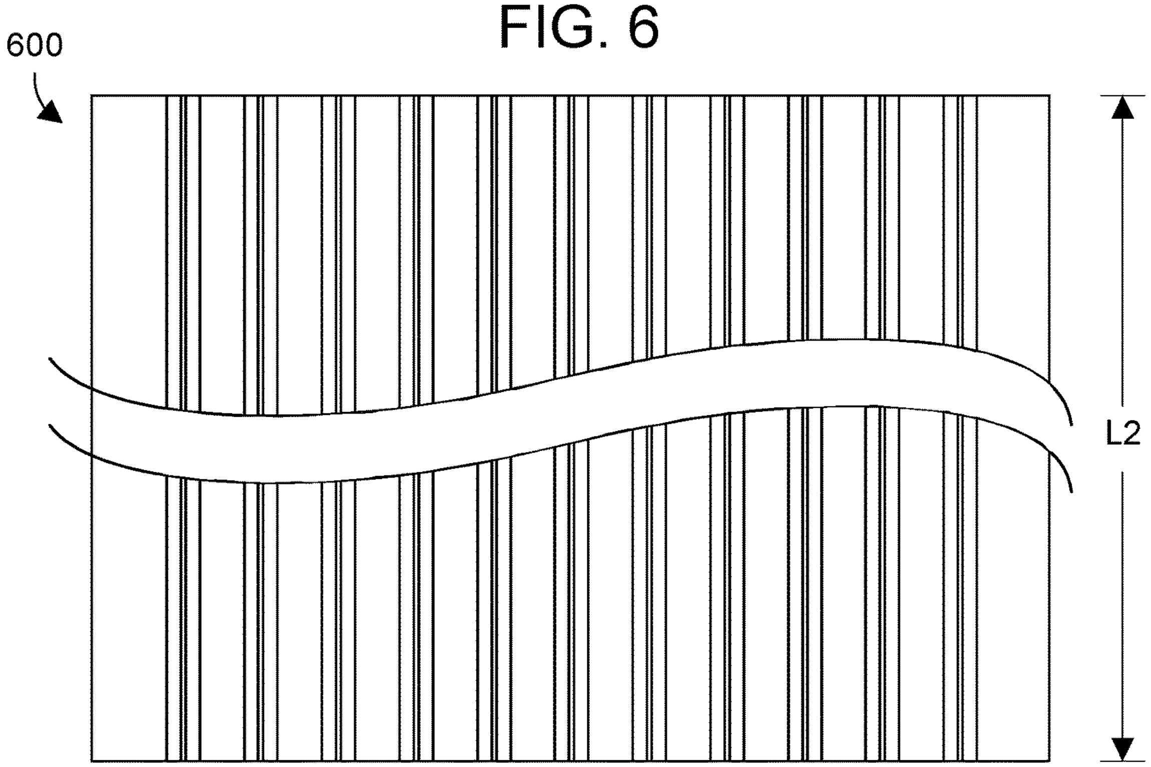
FIG. 7 is a top view of the sticker in FIG. 6 taken along the line 7-7.
Figure 8:
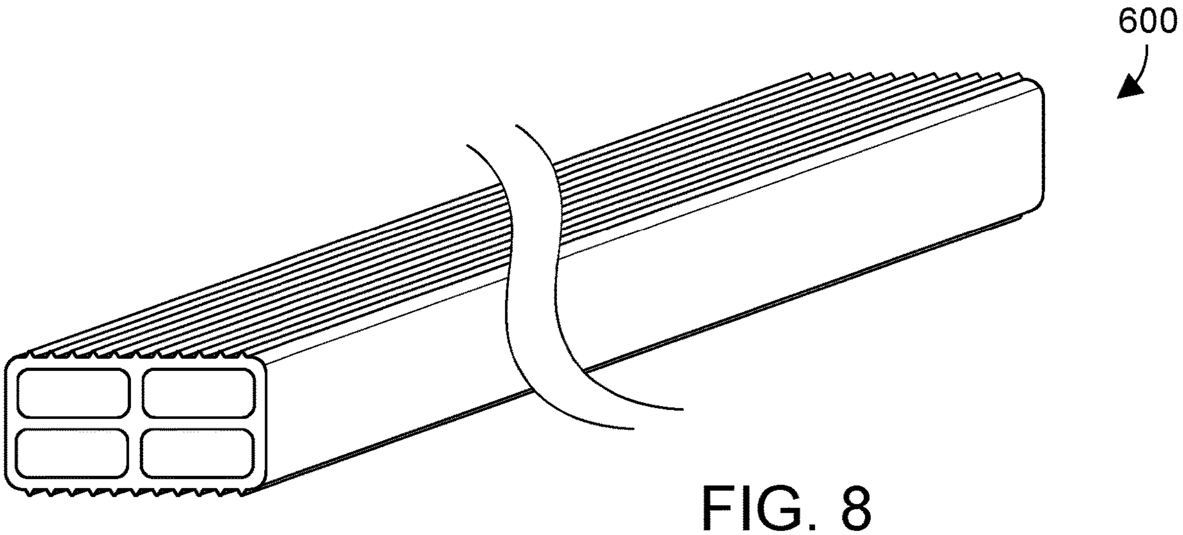
FIG. 8 is a perspective view of the sticker shown in FIGS. 6 and 7.

Referring to FIGS. 6-9, a second suitable configuration of an extruded aluminum sticker 600 in accordance with the disclosure and claims herein is shown. Sticker 600 has an end view as shown in FIG. 6, a top view as shown in FIG. 7, and a perspective view as shown in FIG. 8. Note the end view shown in FIG. 6 is the same as the cross-sectional view because the sticker is extruded through a die to achieve the final profile shown in FIG. 6. The sticker has a height H2, a width W2, and a length L2. The length L2 as shown in FIGS. 7 and 8 can be any suitable length, as represented by the break in the length in FIGS. 7 and 8. In one suitable implementation, the height H2 is 0.80 in. (20 mm), the width W2 is 1.44 in. (37 mm), and the length L2 can be any suitable length, such as 4 ft (1.2 m), 6 ft (1.8 m), 8 ft (2.4 m), and 12 ft (3.7 m). In the preferred configuration, the height H2 of sticker 600 is preferably less than 60% of the width W2. This provides for a rectangular shape that can be handled by existing automated lumber stackers. Of course, the sticker 100 can be made to any suitable dimensions and lengths depending on the specific application.

The top and bottom surfaces of sticker 600 preferably include ridges 610, which can be ridges similar to the ridges 110 shown in FIG. 1, or can be ridges with a different configuration. The side surfaces 640 and 650 of the sticker 600 do not include ridges, but are substantially smooth as shown in FIG. 6. The smooth side surfaces 640 and 650 and the rectangular profile allow the extruded aluminum sticker 600 to be handled by existing automated lumber stackers.

The number of ridges on any surface of the extruded aluminum sticker is preferably at least three, is more preferably at least four, and is most preferably at least five, as shown in FIGS. 1 and 6.

The top, bottom and sides of sticker 600 preferably have a thickness T2 shown in FIG. 6. In the most preferred implementation, the thickness T2 is 0.09 in. (2.3 mm). In the specific implementation shown in FIG. 6, the thickness is the same for all walls in the sticker 600. However the thickness of different parts of the sticker 600 could vary within the scope of the disclosure and claims herein. In addition, the thickness of any side could be significantly more or less than 0.09 in. (2.3 mm) within the scope of the disclosure and claims herein.

Figure 9:
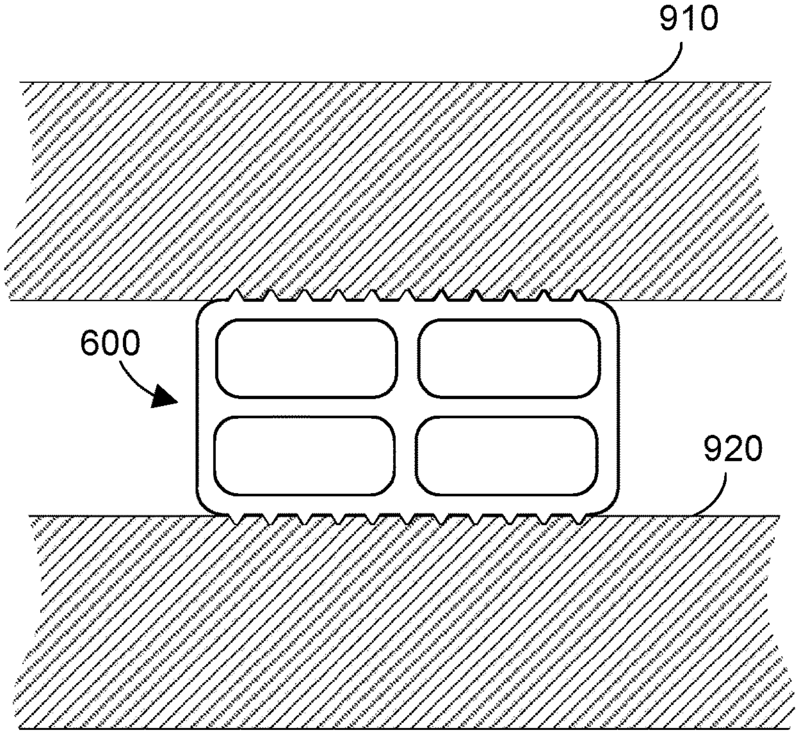
FIG. 9 is a cross-sectional view showing use of the sticker in FIGS. 6-8 for spacing two pieces of wood.

FIG. 9 shows the sticker 600 in FIGS. 6-8 between two boards 910 and 920. The ridges 610 of sticker 600 (see FIG. 6) penetrate the surface of the boards 910 and 920 as shown in FIG. 9. This allows the sticker 600 to bite into the wood and prevent the boards 910 and 920 from sliding on the sticker 600. Most known stickers have smooth surfaces that allow the wood to slide when placed on the sticker. The extruded aluminum sticker 600 includes ridges 600 that bite into the wood and prevent the boards from sliding on the sticker, thereby providing an advantage over most known stickers. As with the extruded aluminum sticker 100 discussed above, the grooves or marks left in wood by the extruded aluminum sticker 600 will typically be removed by the final planing process that achieves the final dimension of the lumber.

While FIGS. 5 and 9 show full penetration of the longitudinal ridges into the surface of the wood until the wood rests on the substantially flat longitudinal spacer portions between each of the longitudinal ridges, the degree of penetration of the longitudinal ridges into the wood surface will depend on many factors, including the hardness and density of the wood and the weight bearing on the extruded aluminum stickers. For example, extruded aluminum stickers that are higher in the stack and thus do not bear as much weight might have longitudinal ridges that only partially penetrate the surface of the wood. In addition, stacking dense hardwoods on the extruded aluminum stickers may result in some of the stickers that have longitudinal ridges that only partially penetrate the surface of the wood. The point of the longitudinal ridges is so the extruded aluminum sticker grips the wood, without regard to a specific depth of penetration of the longitudinal ridges into the wood surface.

Figure 10:
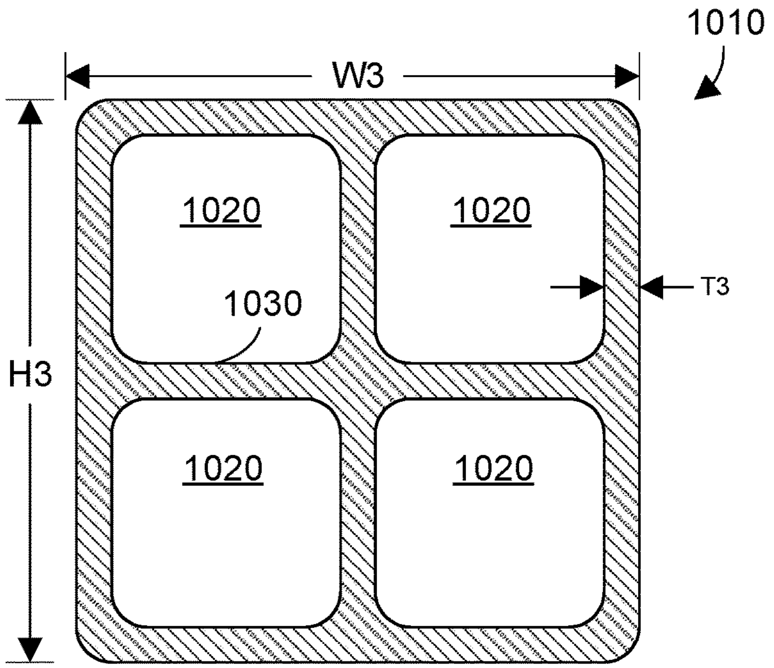
FIG. 10 is an end or cross-sectional view of a cross-out for stacking lumber that can be used in conjunction with the extruded aluminum sticker disclosed herein.

FIG. 10 shows an extruded aluminum cross-out 1010 that can be used in conjunction with the extruded aluminum sticker disclosed herein. Cross-outs are sometimes referred to as bunks or bolsters in the lumber drying industry. Cross-outs are used at the bottom of a stack of lumber to provide sufficient room for the forks of a forklift to go beneath the stack of lumber. The cross-out 1010 in FIG. 10 has a height H2 and a width W3. The height H3 and width W3 are preferably the same. In one specific configuration, the height H3 and width W3 are 4.00 in. (10.2 cm).

The top, bottom and sides of cross-out 1010 preferably have a thickness T3 shown in FIG. 10. In the most preferred implementation, the thickness T3 is 0.19 in. (4.8 mm). In the specific implementation shown in FIG. 10, the thickness is the same for all walls in the cross-out 1010. However the thickness of different parts of the cross-out 1010 could vary within the scope of the disclosure and claims herein. In addition, the thickness of any side could be significantly more or less than 0.19 in. (4.8 mm) within the scope of the disclosure and claims herein. An internal structure 1030 reinforces the sides of the cross-out 1010, and provides four substantially hollow longitudinal internal chambers 1020 as shown in FIG. 10. Of course, the number of substantially hollow longitudinal internal chambers 1020 could vary within the scope of the disclosure and claims herein. The exterior surfaces of the cross-out 1010 are substantially smooth, without ridges. Unlike stickers, cross-outs need a smooth surface so a stack of lumber can be slid along the cross-outs by a forklift as the forklift places a stack of lumber on the cross-outs.

The extruded aluminum cross-out provides significant advantages compared with known wood cross-outs. When shipping lumber overseas, wood cross-outs must be heat treated to destroy pests. In addition, the use of wood cross-outs has to be logged to account for the number of times each wood cross-out is used because wood cross-outs degrade over time. The extruded aluminum cross-out eliminates the need for heat treating to destroy pests and eliminates the logging of the number of uses since the extruded aluminum cross-outs do not degrade over time. The extruded aluminum cross-out also enjoys many of the benefits described with respect to the extruded aluminum sticker, including improved flatness and shape retention, improved straightness, and no deterioration or change in dimensions with use, thereby providing an improved foundation on which to place lumber stacks.

Figure 11:
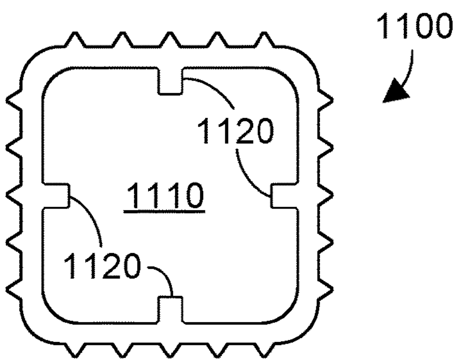
FIG. 11 is an end or cross-sectional view showing a possible variation in internal configuration for the extruded aluminum sticker.
Figure 12:
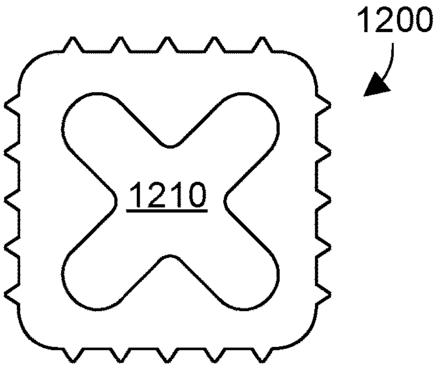
FIG. 12 is an end or cross-sectional view showing a possible variation in internal configuration for the extruded aluminum sticker.
Figure 13:
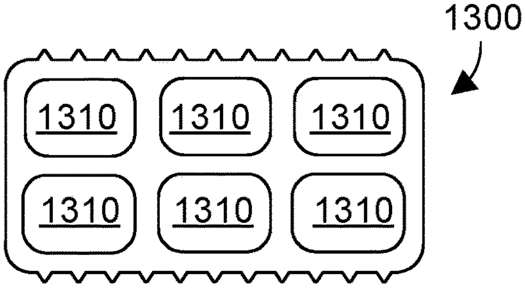
FIG. 13 is an end or cross-sectional view showing a possible variation in internal configuration for the extruded aluminum sticker.
Figure 14:
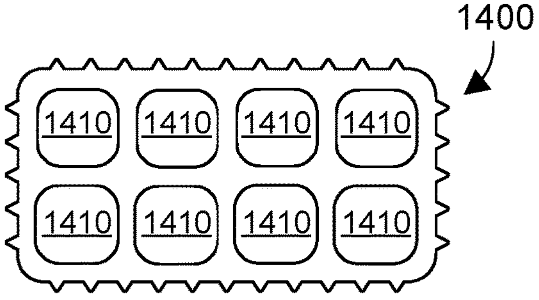
FIG. 14 is an end or cross-sectional view showing a possible variation in internal configuration and external configuration for the extruded aluminum sticker.

The internal and external configuration for the sticker disclosed and claimed herein can vary. For example, FIG. 11 shows an extruded aluminum sticker 1100 that has an exterior configuration similar to sticker 100 in FIG. 1, but has an internal configuration that has a single substantially hollow longitudinal internal chamber 1110. The inside includes a plurality of reinforcing ribs 1120 that strengthen each side using much less aluminum material than the design shown in FIG. 1. FIG. 12 shows an extruded aluminum sticker 1200 that has an exterior configuration similar to sticker 100 in FIG. 1, but has an internal configuration that has a single substantially hollow longitudinal internal chamber 1210 that resembles a plus sign with curved surfaces at a 45 degree angle. FIG. 13 shows an extruded aluminum sticker 1300 that has an exterior configuration similar to sticker 600 in FIG. 6 but includes six substantially hollow longitudinal internal chambers 1310. FIG. 14 shows an extruded aluminum sticker 1400 that has a configuration similar on top and bottom to sticker 600 in FIG. 6, but additionally includes ridges on the side portions and has eight substantially hollow longitudinal internal chambers 1410. The variations in FIGS. 11-14 are shown to illustrate the internal and external configurations for the extruded aluminum sticker and the cross-out may vary within the scope of the disclosure and claims herein.

Figure 15:
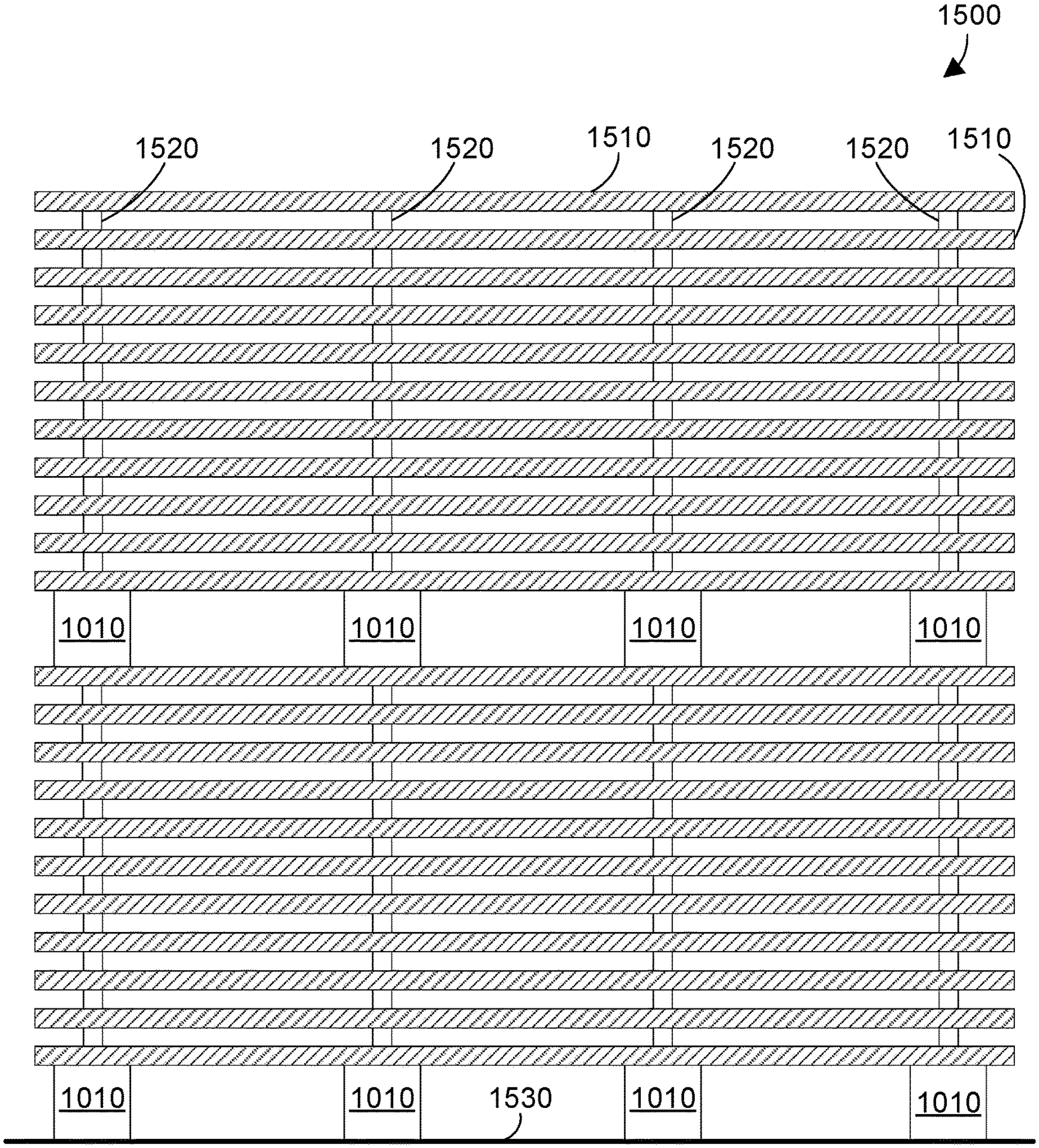
FIG. 15 is a side view of a lumber stack showing use of extruded aluminum stickers and the cross-out shown in FIG. 10.

FIG. 15 shows a side view of two stacks of lumber on top each other to form one larger stack 1500. Each board is separated from other boards by extruded aluminum stickers, as shown in FIG. 15 by boards 1510 being separated by stickers 1520. Stickers 1520 could be sticker 100 shown in FIGS. 1-5, sticker 600 shown in FIGS. 6-9, or any other suitable extruded aluminum sticker within the scope of the disclosure herein. Cross-outs 1010 are placed on a supporting surface 1530, which can be a fixed supporting surface such as the ground or a floor, or can be a mobile supporting surface, such as a cart used to move the stacks of lumber through a kiln, a rail car, etc. A forklift can then move the first stack of lumber, which includes boards separated by extruded aluminum stickers 1520, and place the first stack on the cross-outs 1010 on the supporting surface 1530. A second set of cross-outs 1010 is then placed atop the first stack of lumber, and a second stack of lumber can then be placed atop the second set of cross-outs 1010 using a forklift. The combination of the extruded aluminum stickers and the extruded aluminum cross-out disclosed and claimed herein provides a way to stack and move lumber efficiently in a lumber drying operation. While the stickers 1520 shown in FIG. 15 are shown as squares, it is understood the stickers 1520 in FIG. 15 could have any suitable configuration or cross-section, including the configurations expressly disclosed herein and any other configuration within the scope of the disclosure and claims.

Figure 16:
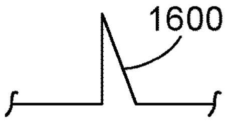
FIG. 16 is a cross-sectional view showing a first alternative configuration for the ridges on the extruded aluminum sticker.
Figure 17:
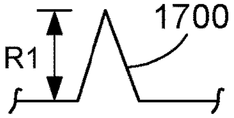
FIG. 17 is a cross-sectional view showing a second alternative configuration for the ridges on the extruded aluminum sticker.
Figure 18:
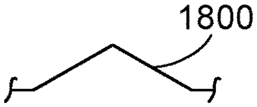
FIG. 18 is a cross-sectional view showing a third alternative configuration for the ridges on the extruded aluminum sticker.
Figure 19:
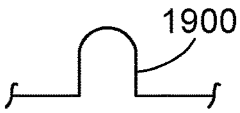
FIG. 19 is a cross-sectional view showing a fourth alternative configuration for the ridges on the extruded aluminum sticker.
Figure 20:
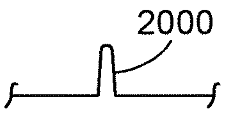
FIG. 20 is a cross-sectional view showing a fifth alternative configuration for the ridges on the extruded aluminum sticker.
Figure 21:
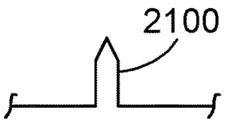
FIG. 21 is a cross-sectional view showing a sixth alternative configuration for the ridges on the extruded aluminum sticker.

The longitudinal ridges on the extruded aluminum sticker can have any suitable configuration or cross-section. FIGS. 16-21 show different possible configurations within the scope of the disclosure and claims herein. FIG. 16 shows a ridge 1600 that has a straight side and an angled side. FIG. 17 shows a ridge 1700 that has two angled sides at a lesser angle than shown in FIG. 1. FIG. 18 shows a ridge 1800 that has two angled sides at a greater angle than shown in FIG. 1. FIG. 19 shows a ridge 1900 that has straight sides and a curved top. FIG. 20 shows a ridge 2000 that has slightly angled sides and a narrow curved top. FIG. 21 shows a ridge 2100 that has straight sides and an angled point. These examples in FIGS. 16-21 are shown to broadly represent that the ridges on an extruded aluminum sticker can have any suitable configuration within the scope of the disclosure and claims herein.

Figure 22:
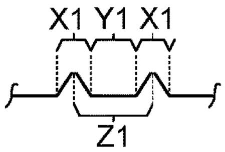
FIG. 22 is a cross-sectional view showing spacing of the ridges on the extruded aluminum sticker.
Figure 23:
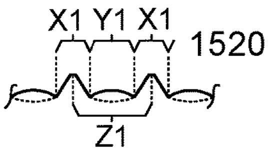
FIG. 23 is a cross-sectional view showing spacing of the ridges and convex/concave portions between the ridges on the extruded aluminum sticker.
Figure 24:
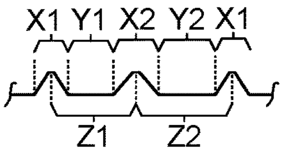
FIG. 24 is a cross-sectional view showing different widths of ridges and different spaces between ridges on the extruded aluminum sticker.

FIGS. 22-24 are shown to represent the size of the ridges, the spacing between ridges, and the spacer portions between ridges can vary within the scope of the disclosure and claims herein. FIG. 22 shows two ridges that have a width X1 and that are a distance Z1 apart peak-to-peak, with a portion Y1 that is a substantially flat longitudinal spacer portion between the two ridges. FIG. 23 shows two ridges that have a width X1 that are a distance Z1 apart peak-to-peak, with a portion Y1 that is a substantially convex longitudinal spacer portion between the two ridges. In an alternative configuration, the portion Y1 could be a substantially concave longitudinal spacer portion between the two ridges, as shown by the lower dotted lines in FIG. 23. FIG. 24 shows three ridges that have two different widths and that have different spacings apart. The first and third ridges have a first width X1 while the second ridge in between has a wider width X2. The first and second ridges are separated by a distance Z1 peak-to-peak, creating a space Y1 between ridges that is shown in FIG. 24 to be substantially flat. The second and third ridges are separated by a distance Z2 peak-to-peak, creating a space Y2 between ridges that is shown in FIG. 24 to be substantially flat. The spaces Y1 and Y2 could have spacer portions that have any suitable configuration. The longitudinal spacer portions between ridges can be substantially flat (as shown in FIG. 24), substantially concave, substantially convex, or any other combination of features that could be defined in an extrusion die. For example, a longitudinal spacer portion between ridges could have a combination of flat, concave, convex, curved and straight features.

Figure 25:
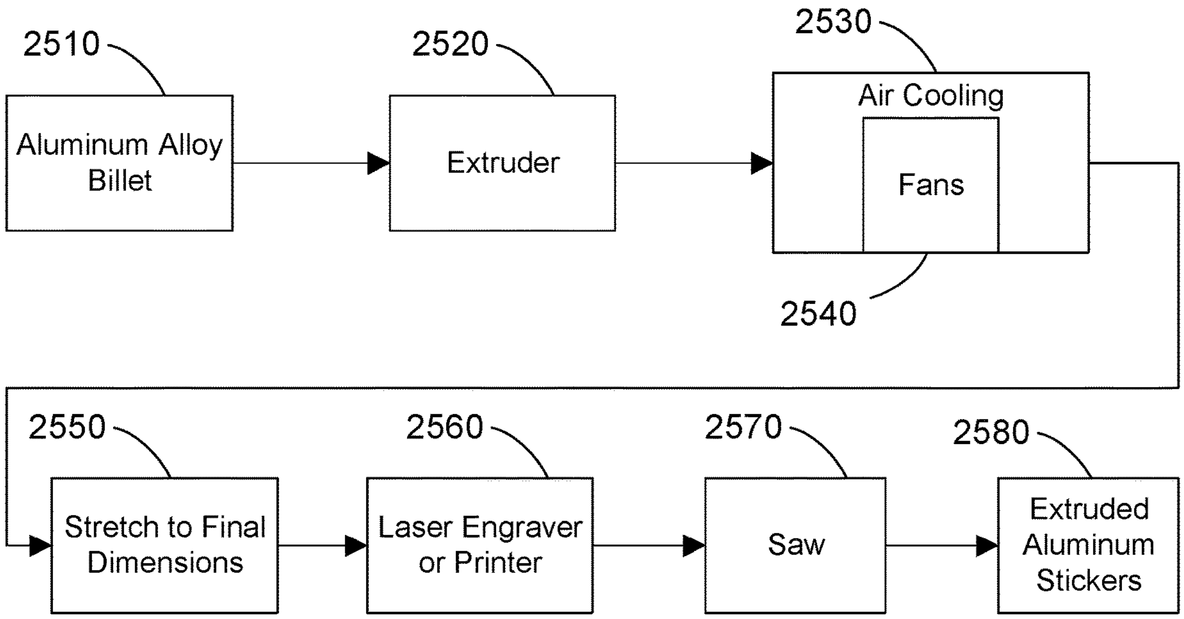
FIG. 25 is a production flow diagram showing a manufacturing process for manufacturing the extruded aluminum sticker.

FIG. 25 shows a manufacturing process for making the extruded aluminum stickers. An aluminum alloy billet 2510 is provided, which is typically a cylindrical log of aluminum alloy that has a defined diameter and length. The aluminum alloy billet is heated to a desired temperature, then placed into the extruder 2520. Extruded 2520 presses the billet against a die, creating long extrusions with a shape defined by the die. The long extrusions are put in an air cooling area 2530, which may include one or more fans 2540. Once the long extrusions have cooled somewhat, the long extrusions are stretched 2550, thereby causing the long extrusions to reach their final desired dimensions. The long extrusions are then marked by a laser engraver or printer 2560. The long extrusions then go to a saw 2570, which cuts the long extrusions into desired lengths to provide the final extruded aluminum stickers 2580. Note that step 2560 could be moved to after the sawing operation so the extruded aluminum stickers are marked after they are sawed to length.

The extruded aluminum sticker disclosed herein can be made from any of the following known series of aluminum alloys: 3000, 4000, 5000, 6000 or 7000. In particular, the 3003, 5052, 6005A, 6061, 6063, and the 7000 are the preferred alloys in this group. The characteristics and specifications for each of these aluminum alloys is published and well-known in the art. In the most preferred implementation, the preferred aluminum alloy is 6005A with a T5 or T61 temper, as this aluminum alloy and these tempers provides a great combination of strength, manufacturability, durability and economy for the extruded aluminum stickers disclosed and claimed herein.

Figure 26:
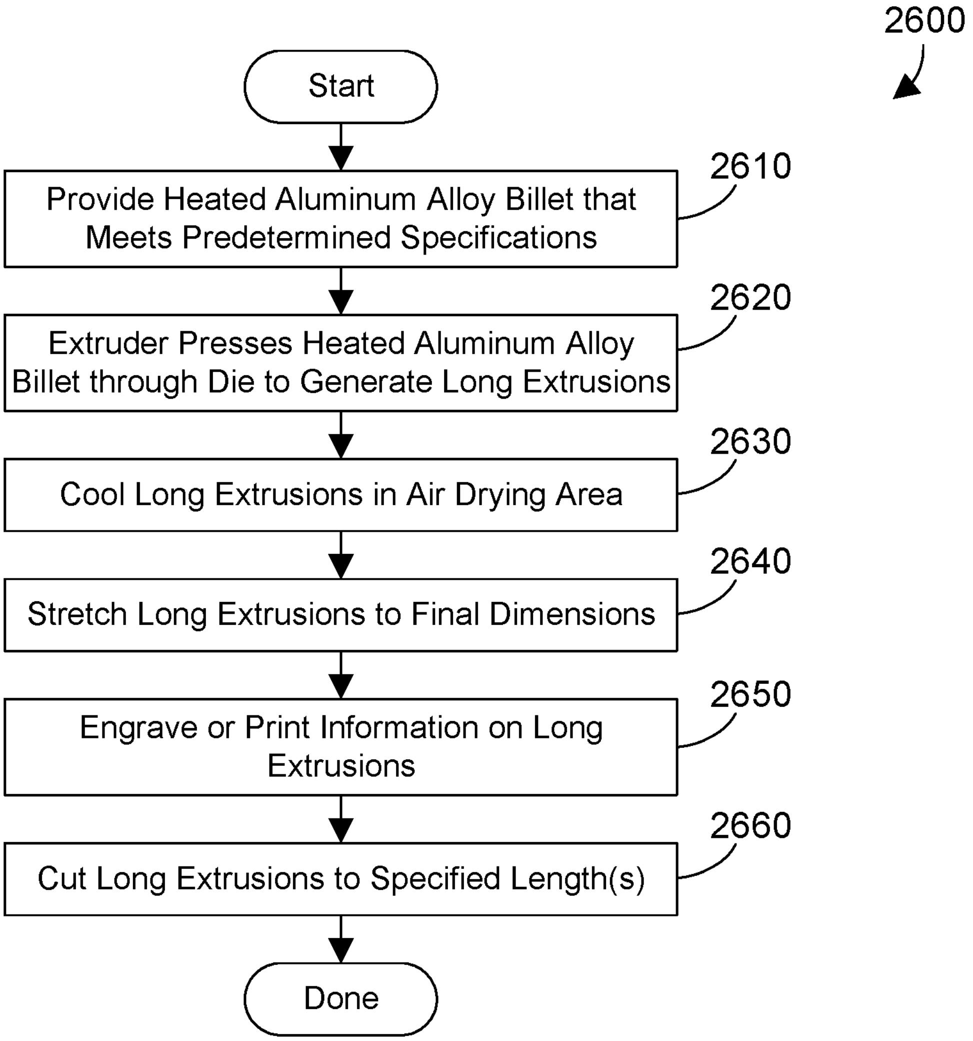
FIG. 26 is a flow diagram of a method for manufacturing the extruded aluminum sticker.

A method 2600 in FIG. 26 shows the specific steps discussed above with respect to FIG. 25. A heated aluminum alloy billet that meets predetermined specifications is provided (step 2610). The predetermined specifications determine the characteristics of the alloy, such as 6005A-T61 described in the preceding paragraph, along with the heat of the billet. The heated aluminum alloy billet is placed into an extruder, and the extruder then presses the heated aluminum alloy billet through a die to generate long extrusions (step 2620). Cool the long extrusions in an air drying area (step 2630). Stretch the long extrusions to achieve the final dimensions (step 2640). Engrave or print information on the long extrusions (step 2650). Cut the long extrusions into one or more specified lengths (step 2660). Method 2600 is then done. Note the step of engraving or printing information in step 2650 is optional, but allows for putting any suitable information on the long extrusions, including date of manufacture, product name (trademark), etc., so this information appears on each of the final extruded aluminum stickers. In addition, the order of steps 2650 and 2660 can be reversed so the long extrusion are first cut to length, then the cut lengths are marked.

Figure 27:
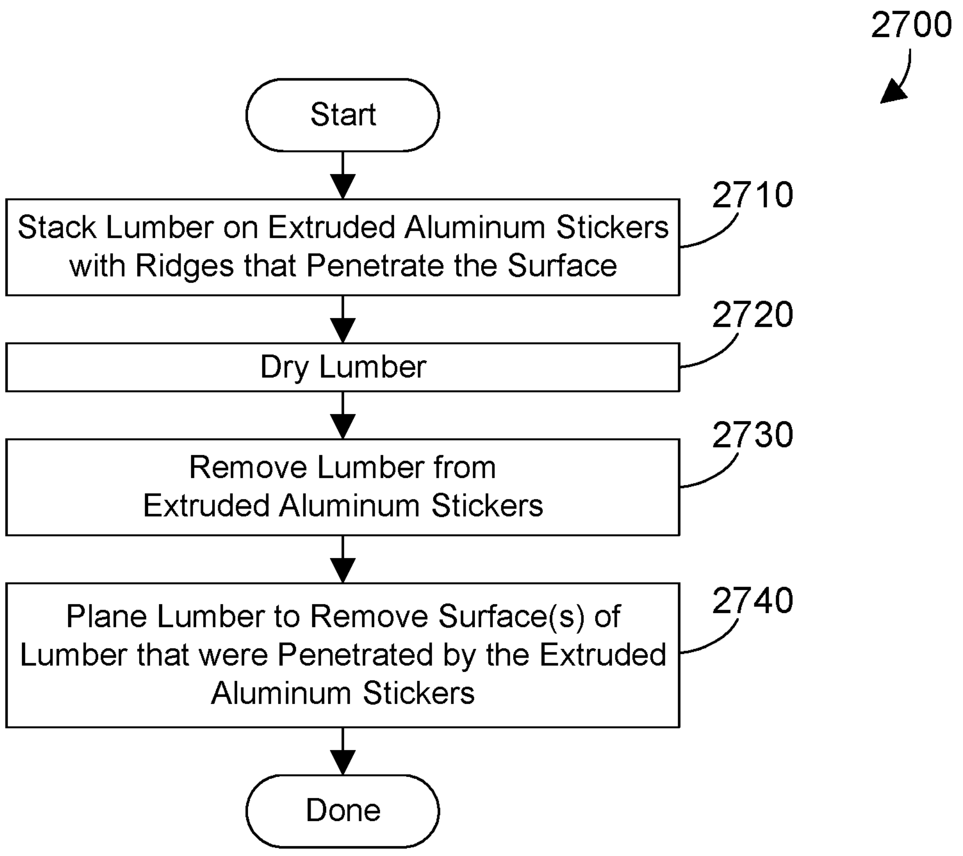
FIG. 27 is a flow diagram of a method for processing lumber using extruded aluminum stickers.

Referring to FIG. 27, a method 2700 shows how to use the extruded aluminum stickers disclosed and claimed herein in the process of drying lumber. Stack the lumber on extruded aluminum stickers with ridges that penetrate the surface of the lumber (step 2710). Dry the lumber (step 2720). The drying in step 2720 can be either air drying or kiln drying. Once dry in step 2720, remove the lumber from the extruded aluminum stickers (step 2730). Plane the lumber to remove the surfaces of the lumber that were penetrated by the ridges on the extruded aluminum stickers (step 2740). Method 2700 is then done.

A comparison of the extruded aluminum sticker disclosed herein with other known stickers shows the many advantages of the extruded aluminum sticker. We start first by comparing the extruded aluminum stickers with smooth wood stickers that have been in use for drying lumber for over a century. As discussed in the Background of the Invention section above, the typical life of a wood sticker is 8-15 drying cycles. Wood stickers made of Ipê wood (also called Brazilian walnut) can last as long as 30-40 cycles, but Ipê wood is taken from trees in the rain forests of Central and South America and Indonesia, thereby contributing to the deforestation of the rain forests. The extruded aluminum stickers disclosed herein will last for hundreds or even thousands of cycles. Even though the extruded aluminum stickers have a much higher manufacturing cost than smooth wood stickers, the long life of the extruded aluminum stickers produces substantial cost benefits over time. In addition, the extruded aluminum stickers do not contribute to the deforestation of rain forests. Furthermore, standard wood stickers have a smooth surface that does not bite into the wood, allowing lumber to slide on the stickers as stacks are moved with a forklift. The extruded aluminum stickers are more economical over time, more eco-friendly, and grip the wood in a stack so the wood does not slide on the extruded aluminum stickers.

Another advantage of extruded aluminum stickers compared to wood stickers is extruded aluminum stickers can be stored outside in the weather, where wood stickers need to be stored inside to prevent damage from the weather. Extruded aluminum stickers do not absorb or hold moisture. Extruded aluminum stickers can be used in a hot, humid environment and can be used in a very cold environment without affecting their performance and without the extruded aluminum stickers degrading over time.

Several different types of plastic stickers have been developed over time, including extruded plastic stickers. The extruded aluminum stickers disclosed herein have several advantages over extruded plastic stickers. The manufacturing tolerances on extruded aluminum stickers are substantially better than the manufacturing tolerances on extruded plastic stickers, resulting in better consistency of product. Extruded plastic stickers sometimes have a tendency to twist as they cool, thereby rendering all or a portion of a long extrusion unsuitable for use as a sticker. The unusable plastic is typically ground up and reused by adding the ground plastic to a different batch. The extruded aluminum stickers, in contrast, have tight manufacturing tolerances, typically to about 0.005 in. (0.13 mm), and are not prone to twist or warp. In addition, the stretching step for the long extrusions (see 2550 in FIGS. 25 and 2640 in FIG. 26) can remove any slight twist or irregularity, resulting in long extrusions that are very straight and do not twist. The extruded aluminum stickers are therefore much easier to produce, with tighter dimensional tolerances, with less waste, and have a lower cost per cycle than wood or plastic stickers.

Aluminum in the extruded aluminum stickers disclosed herein is stronger than wood or plastic, and requires less material to support a lumber stack. In addition, the extruded aluminum stickers are much better conductors of heat than wood or plastic stickers. As a result, the heat in a kiln is transferred easily to the extruded aluminum stickers, which transfers its heat to the surfaces of the lumber stacked on the extruded aluminum stickers clear to the core of the lumber stack. The good heat conduction of the extruded aluminum stickers allows more uniform heat to be applied and permits the drying process to be controlled with fewer variations than when using wood or plastic stickers. Fewer variations means more uniform and repeatable consistency over the processes used when compared to using wood or plastic stickers. The good heat conduction of the extruded aluminum stickers may reduce the time to dry the lumber in the kiln, leading to greater throughput of lumber though the kiln and less energy consumed to dry the lumber. Furthermore, the extruded aluminum stickers can last for hundreds or even thousands of cycles. Both wood and plastic stickers are prone to break after some uses, and must be replaced. Both wood and plastic stickers degrade over time. Extruded aluminum stickers, in contrast, retain their strength over time, and can even become stronger through a process commonly referred to as age-tempering. In addition, extruded aluminum stickers can be easily recycled when they reach the end of their life or become damaged. The extruded aluminum stickers are actually much more economical and more eco-friendly that wood or plastic stickers.

The use of wood stickers can also attribute to degrade issues in lumber. According to a study performed in 1973 by Simpson Timber Company that can be accessed at https://ir.library.oregonstate.edu/downloads/3b591990r, a survey of one mill estimated that drying-related degrade due to the use of wood stickers reduces by at least one grade in at least 5% of the volume of output. This degrade is directly attributed to wooden stickers that are damaged but still in use, or that may become damaged during the drying process. The breakage factor in wood stickers was calculated to be 10.7% of wood stickers lost per kiln charge. Because the extruded aluminum stickers do not break while in use, the use of extruded aluminum stickers significantly reduces the degrade of lumber associated with using traditional wood stickers. In addition, it is believed the use of the extruded aluminum stickers disclosed herein will result in reduction in crook found in dried lumber after the lumber is removed from the kiln.

U.S. Pat. No. 4,788,777 (the '777 patent) discloses an extruded rectangular sticker made of a mixture of polycarbonate resin, polysulfone resin and glass fiber. The primary problem with the configurations of stickers shown in the '777 patent is they have a smooth top and bottom surface. With a sticker that has smooth top and bottom surfaces as shown in the '777 patent, the stickers will not be able to grip the wood stacked on the stickers. This is a problem because stacks of wood are typically moved into a kiln and removed from a kiln using forklifts. With the smooth stickers in the '777 patent, a stack of lumber would have the tendency to slide off the stickers because the surfaces of the stickers are smooth.

The problem with the sticker disclosed in the '777 patent discussed above is eliminated in the extruded aluminum sticker disclosed and claimed herein. The ridges on the extruded aluminum sticker disclosed herein bite into the wood, preventing lumber from sliding on the extruded aluminum stickers.

U.S. Pat. No. 5,345,695 (the '695 patent) discloses a channel-shaped sticker made of metal or plastic. The stickers in the '695 patent have smooth faces that cannot grip the wood. The ridges on the extruded aluminum stickers disclosed herein grip the wood, preventing a stack of wood from sliding as the stack is transported by a forklift.

U.S. Pat. No. 9,851,148 (the '148 patent) discloses an extruded polycarbonate sticker that includes multiple longitudinal ridges that contact wood. The ridges in the '148 patent are small enough and close enough together that they are easily clogged with wood fibers, and wear off over time as the extruded polycarbonate sticker is used. The extruded polycarbonate sticker in the '148 patent further includes lateral ridges as well as longitudinal ridges that create cross-hatched ridges and grooves, as shown in FIG. 1 of the '148 patent. Once the ridges become clogged with wood fibers, it takes a wire brush and substantial work to clean out the wood fibers from the ridges in order to restore the extruded polycarbonate sticker to its original state. The extruded aluminum sticker, in contrast, has no lateral ridges or grooves. The ridges in the extruded aluminum sticker disclosed herein have a height and spacing that minimizes the likelihood of the ridges getting clogged with wood fiber. When sap begins to fill the spaces between ridges, the extruded aluminum stickers are easily cleaned by placing the stickers upright on end in a corner of a kiln in a container, which will cause any sap that has accumulated on the sticker to run down the sticker and into the container due to the heat in the kiln. The extruded aluminum sticker as disclosed is therefore very easy to clean and restore to its original state without substantial labor to clean out the spaces between the ridges.

Extruded aluminum stickers have been used to dry lumber. Known extruded aluminum stickers are tubular aluminum have a square or rectangular cross-section and a hollow center that has no reinforcing members. An extruded aluminum sticker that has a hollow center without any reinforcing members will need to have wall thicknesses substantially greater than what is required for the extruded aluminum stickers disclosed herein because of the reinforcing members (e.g., 130 in FIGS. 1 and 630 in FIG. 6). In addition, known extruded tubular aluminum stickers have smooth exterior surfaces, which means the stickers cannot bite into the wood to prevent the wood from sliding on the stickers when a stack of lumber is being moved by a forklift. The extruded aluminum sticker disclosed herein includes ridges that have a defined number, height and spacing peak-to-peak that optimize the bite of the stickers into wood.

In the softwood industry, most of the stacking of lumber on stickers is done by stacking machines that alternatively place the stickers, then stack a layer of wood, then place the next layer of stickers, followed by the next layer of wood, and so on. Many of the existing stacking machines in the softwood industry expect a rectangular sticker. For these machines, the configuration shown in FIGS. 6-9 that has a substantially rectangular shape will allow the extruded aluminum stickers to be used with existing automated machines that stack lumber.

The disclosure herein supports a sticker for spacing wood comprising: an extruded body made of an aluminum alloy, the extruded body comprising: a top surface comprising: a first plurality of longitudinal ridges; and a first plurality of substantially flat longitudinal spacer portions between each of the first plurality of longitudinal ridges; a bottom surface comprising: a second plurality of longitudinal ridges; and a second plurality of substantially flat longitudinal spacer portions between the second plurality of longitudinal ridges.

The disclosure herein further supports a sticker for spacing wood comprising: an extruded body made of aluminum alloy, the extruded body comprising: a plurality of substantially hollow longitudinal internal chambers; a top surface comprising: at least five top longitudinal ridges that are each separated from adjacent longitudinal ridges by at least 0.10 in. (2.5 mm) peak-to-peak and by no more than 0.3 in. (7.6 mm) peak-to-peak, wherein each of the top longitudinal ridges has a height from 0.02 in. (0.51 mm) to 0.032 in. (0.81 mm); and a bottom surface comprising: at least five bottom longitudinal ridges that are each separated from adjacent longitudinal ridges by at least 0.10 in. (2.5 mm) peak-to-peak and by no more than 0.3 in. (7.6 mm) peak-to-peak, wherein each of the bottom longitudinal ridges has a height from 0.02 in. (0.51 mm) to 0.032 in. (0.81 mm); a first side surface that connects the top surface to the bottom surface, the first side surface comprising at least five first side longitudinal ridges that are each separated from adjacent longitudinal ridges by at least 0.10 in. (2.5 mm) peak-to-peak and by no more than 0.3 in. (7.6 mm) peak-to-peak, wherein each of the first side longitudinal ridges has a height from 0.02 in. (0.51 mm) to 0.032 in. (0.81 mm); and a second side surface that connects the top surface to the bottom surface, the second side surface comprising at least five second side longitudinal ridges that are each separated from adjacent longitudinal ridges by at least 0.10 in. (2.5 mm) peak-to-peak and by no more than 0.3 in. (7.6 mm) peak-to-peak, wherein each of the second side longitudinal ridges has a height from 0.02 in. (0.51 mm) to 0.032 in. (0.81 mm).

A sticker for spacing wood is extruded from an aluminum alloy. The sticker can have different configurations. In a first configuration, the sticker has a width about the same as its height, with longitudinal ridges on all sides that grip wood when wood is stacked on the sticker. In a second configuration, the sticker has a width significantly greater than its height, with longitudinal ridges on the top and bottom surfaces, and with smooth side surfaces. The longitudinal ridges have a height within a specified range and are spaced at a distance peak-to-peak within a specified range. The ridges provide good grip of lumber stacked on the sticker yet do not easily plug with wood fibers through repeated use. The extruded aluminum sticker is very rugged and can be used for hundreds or even thousands of drying cycles.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A sticker for spacing wood comprising:

an extruded body made of an aluminum alloy, the extruded body comprising:

a top surface comprising:

a first plurality of longitudinal ridges each having a substantially triangular cross-section; and a first plurality of substantially flat longitudinal spacer portions between each of the first plurality of longitudinal ridges;

a bottom surface comprising:

a second plurality of longitudinal ridges each having a substantially triangular cross-section; and a second plurality of substantially flat longitudinal spacer portions between the second plurality of longitudinal ridges.

2. The sticker of claim 1 wherein the extruded body comprises at least one substantially hollow longitudinal internal chamber.

3. The sticker of claim 1 wherein the first plurality of longitudinal ridges comprises at least four longitudinal ridges and the second plurality of longitudinal ridges comprises at least four longitudinal ridges.

4. The sticker of claim 1 wherein the extruded body further comprises:

a first side surface that connects the top surface to the bottom surface, the first side surface comprising a first substantially smooth exterior surface that has no longitudinal ridges; and a second side surface that connects the top surface to the bottom surface, the second side surface comprising a second substantially smooth exterior surface that has no longitudinal ridges.

5. The sticker of claim 4 wherein the first and second side surfaces have a height that is less than 60% of a width of the top surface and the bottom surface.

6. The sticker of claim 1 wherein the extruded body further comprises:

a first side surface that connects the top surface to the bottom surface, the first side surface comprising:

a third plurality of longitudinal ridges; and a third plurality of substantially flat longitudinal spacer portions between each of the third plurality of longitudinal ridges; and a second side surface that connects the top surface to the bottom surface, the second side surface comprising:

a fourth plurality of longitudinal ridges; and a fourth plurality of substantially flat longitudinal spacer portions between each of the fourth plurality of longitudinal ridges.

7. The sticker of claim 1 wherein the aluminum alloy comprises 6005A alloy.

8. The sticker of claim 1 wherein each of the first plurality of longitudinal ridges are separated from adjacent longitudinal ridges by at least 0.06 in. (1.5 mm) and by no more than 0.4 in. (10 mm) peak-to-peak.

9. The sticker of claim 1 wherein each of the first and second plurality of longitudinal ridges are separated from adjacent longitudinal ridges by at least 0.10 in. (2.5 mm) and by no more than 0.3 in. (7.6 mm) peak-to-peak.

10. The sticker of claim 1 wherein each of the first plurality of longitudinal ridges are separated from adjacent longitudinal ridges by approximately 0.13 in. (3.3 mm) peak-to-peak.

11. The sticker of claim 1 wherein each of the first and second plurality of longitudinal ridges has a height from 0.01 in. (0.25 mm) to 0.05 in. (1.3 mm).

12. The sticker of claim 1 wherein each of the first and second plurality of longitudinal ridges has a height from 0.02 in. (0.51 mm) to 0.032 in. (0.81 mm).

13. The sticker of claim 1 wherein each of the first and second plurality of longitudinal ridges has a height of approximately 0.03 in. (0.76 mm).

14. A sticker for spacing wood comprising:

an extruded body made of aluminum alloy, the extruded body comprising:

a plurality of substantially hollow longitudinal internal chambers;

a top surface comprising:

at least five top longitudinal ridges that are each separated from adjacent longitudinal ridges by at least 0.10 in. (2.5 mm) peak-to-peak and by no more than 0.3 in. (7.6 mm) peak-to-peak, wherein each of the top longitudinal ridges has a height from 0.02 in. (0.51 mm) to 0.032 in. (0.81 mm); and a bottom surface comprising:

at least five bottom longitudinal ridges that are each separated from adjacent longitudinal ridges by at least 0.10 in. (2.5 mm) peak-to-peak and by no more than 0.3 in. (7.6 mm) peak-to-peak, wherein each of the bottom longitudinal ridges has a height from 0.02 in. (0.51 mm) to 0.032 in. (0.81 mm);

a first side surface that connects the top surface to the bottom surface, the first side surface comprising at least five first side longitudinal ridges that are each separated from adjacent longitudinal ridges by at least 0.10 in. (2.5 mm) peak-to-peak and by no more than 0.3 in. (7.6 mm) peak-to-peak, wherein each of the first side longitudinal ridges has a height from 0.02 in. (0.51 mm) to 0.032 in. (0.81 mm); and a second side surface that connects the top surface to the bottom surface, the second side surface comprising at least five second side longitudinal ridges that are each separated from adjacent longitudinal ridges by at least 0.10 in. (2.5 mm) peak-to-peak and by no more than 0.3 in. (7.6 mm) peak-to-peak, wherein each of the second side longitudinal ridges has a height from 0.02 in. (0.51 mm) to 0.032 in. (0.81 mm).

15. The sticker of claim 14 wherein the first and second side surfaces have a height that is approximately the same as a width of the top surface and the bottom surface.

16. The sticker of claim 14 wherein the aluminum alloy comprises 6005A alloy.

* * * * *